Aug. 5, 1958
E. C. HENDRICKSON
2,846,276
TRAILING IDLER
Filed Jan. 11, 1957
3 Sheets-Sheet 1
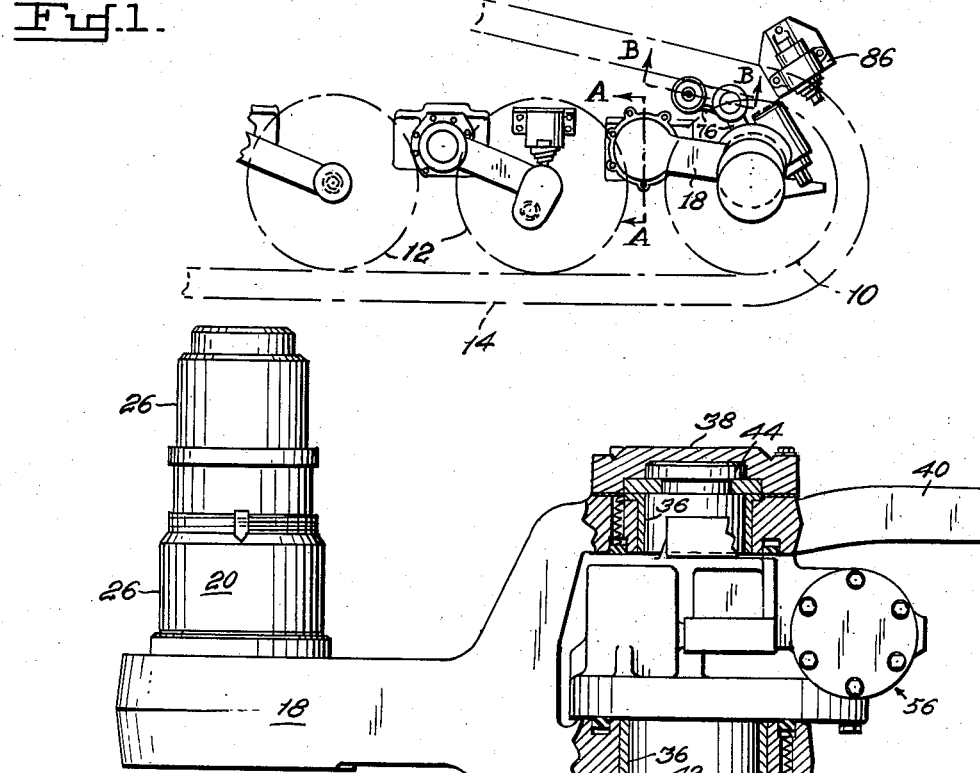
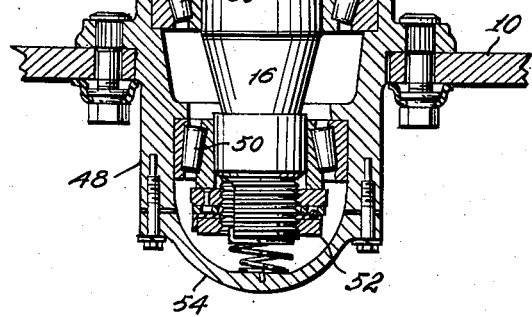
INVENTOR.
Ellis C. Hendrickson
BY
W. E. Thibodeau, A. W. Lew & R. M. Lyon Aug. 5, 1958
E. C. HENDRICKSON
2,846,276
TRAILING IDLER Filed Jan. 11, 1957

INVENTOR.
Ellis C. Hendrickson
BY
W. E. Thibodeau, A. W. Dew & R. M. Lyon

Aug. 5, 1958
E. C. HENDRICKSON
2,846,276
TRAILING IDLER
Filed Jan. 11, 1957
3 Sheets-Sheet 3
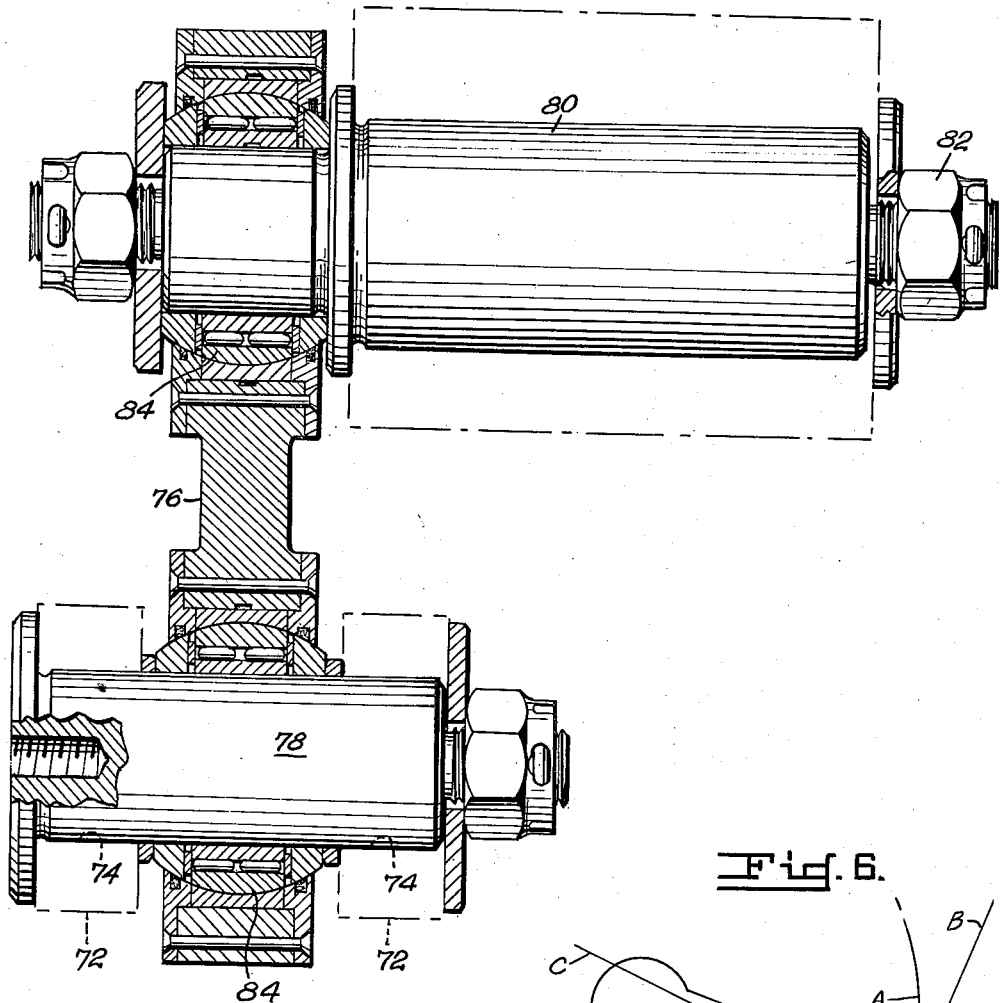
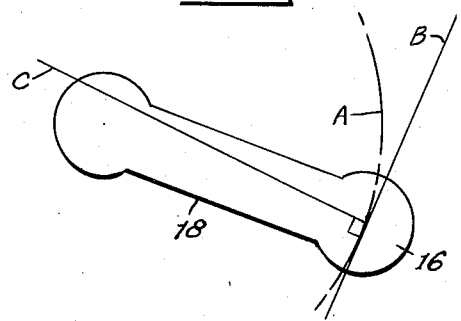
INVENTOR.
Ellis C. Hendrickson
BY
W. E. Thibodeau, A. W. Pew & R. M. Lyon

United States Patent Office 2,846,276
Patented Aug. 5, 1958

2,846,276

TRAILING IDLER

Ellis C. Hendrickson, Seattle, Wash., assignor to the United States of America as represented by the Secretary of the Army Application January 11, 1957, Serial No. 633,812

9 Claims. (Cl. 305—9)

The invention relates to a trailing idler assembly for vehicles, particularly to vehicles of the track laying type.

In the operation of track laying vehicles, particularly military vehicles where the speeds are high and the vehicle very heavy, there is rapid fluctuation of the tension in the track as the vehicle turns or travels over uneven ground. These changes in track tension cause irregular distribution of the vehicle weight on the supporting roadwheels and also induces slack that often results in the track "jumping" from the guiding grooves of the supporting wheels causing the track to be thrown, which disables the vehicle.

Much of the difficulties caused by irregular tension occur at the trailing idler wheel as this wheel is a point where the track changes the direction of travel, and thus the idler will be most susceptible to track tension changes. The trailing idler wheel usually is provided with adjustable means for initially setting the track tension and means for compensating for the fluctuations in the tension, however, the compensating means used heretofore have not eliminated the slack sufficiently to prevent the track from being thrown, and also subject the idler to excessive pressure where the track is tensioned by contact with an obstacle on the ground.

Prior compensating means for track trailing idlers have included wheels which were constantly biased such that the track is under a steady linear tension while stationary, however, this construction did not function properly with tanks and other vehicles which were capable of high speeds as the rapid changes in acceleration and irregular tension caused by uneven terrain could not be sufficiently compensated for by the biased idler. A more recent and superior type of trailing idler has been developed which is pivotally mounted to the frame of the vehicle such that a change of tension in the track will cause the idler wheel to move up or down increasing or decreasing the length to track supporting the vehicle and maintaining a substantially constant tension, however, this construction tends to subject the idler wheel to such high stresses due to a shifting of a greater percentage of the vehicle weight to the idler wheel that the life of the idler is shortened, resulting in high maintenance costs.

It is the purpose of the invention to overcome the above mentioned disadvantages of the prior idler wheel constructions by designing an idler which will allow the trailing idler wheel to carry a normal percentage, depending only on its spring position, of the vehicle weight at all times irrespective of track tension. The superior performance of the idler wheel construction disclosed herein lies in the novel relationship of the track adjusting mechanism and the automatically adjusted hub which permits the idler wheel to move linearly, even though attached to the vehicle frame by a pivoted link.

It is an object of the invention to produce a trailing idler which will simultaneously function as a road-wheel, a track adjusting unit and a compensating idler.

A further object of the invention is to design a trailing idler which is pivotally supported by the vehicle frame yet moves in a nearly linear path perpendicular to the line intersecting the track angle of the trailing idler.

Yet another object of the invention is to produce a trailing idler which will not be subject to undue stress and weight being imposed on the idler wheel because of changes in the weight distribution caused by changes in the track length.

Other objects of the invention will appear from the following description taken in connection with the drawings which form a part of this specification and in which:

Fig. 1 is an elevational view of a track supporting mechanism employing the invention.

Fig. 2 is a semi-sectional view of the trailing idler wheel, axle and supporting mechanism.

Fig. 5 is a cross-sectional view of the link taken on line B—B of Fig. 1.

Fig. 6 is a diagram of the paths of motion of two types of trailing idler axles.

Figure 3:
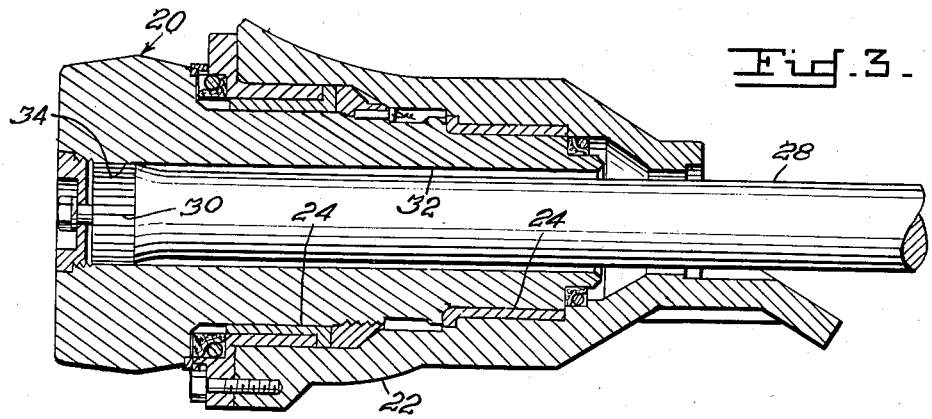
Fig. 3 is a cross-sectional elevation of the arm support taken on line A—A of Fig. 1.

As is common with many tracked vehicles, the trailer idler is shown as mounted at the rear end of a series of road wheels wherein in Fig. 1 the trailing idler wheel 10 is located trailing a series of road wheels 12. The road wheels are supported by axle means carried by the vehicle frame, however, such structure, forming no part of the invention, is not shown in detail.

In general, the trailing idler unit consists of a wheel 10 which is grooved peripherally and guides track 14, the wheel 10 rotates on an axle 16, which is supported by an arm 18, which is in turn supported by a torsion spring and bearing system carried by the vehicle frame.

As viewed in Fig. 2, it will be seen that a spindle 20 extends from arm 18 for mounting the arm 18 to the vehicle. A bearing box 22, Fig. 3, is rigidly fixed to the vehicle frame and contains bearings 24 such that the spindle 20 may be supported within the bearing box 22 by coacting bearing surfaces 26 formed thereon. A torsion bar 28 is fixed to the vehicle at one end and is formed with splines 30 at the free end which extends into a bore 32 of spindle 20 and engages splines 34 formed in bore 32. It is thus seen that the spindle 20 may rotate within box 22 to the extent permitted by torsion bar 28.

The other end of arm 18 is Y shaped, as seen in Fig. 2, and is formed with bore 36 which is lined with a bearing surface. A cap 38 is fastened to arm 18 concentric with bore 36 and an extension 40 protrudes from one of the branches of arm 18 for purposes herein later described.

A shaft 42 is rotatably supported within bore 36 and is held in position by a thrust collar 44 located in cap 38, the portion intermediate the branches of arm 18 being formed with splines, not shown. An enlarged portion 46 is formed integral with shaft 42 and supports axle 16 thereon such that the axes of shaft 42 and axle 16 are parallel and offset from each other.

The hub 48 of the trailing idler wheel 10 is rotatably mounted on axle 16 by means of anti-friction bearings 50 which are held in place by a nut and locking assembly 52 threaded on the end of axle 16. A cap 54 is removably fastened to hub 48 to provide access to nut assembly 52 for lubrication and adjustment purposes.

Figure 4:
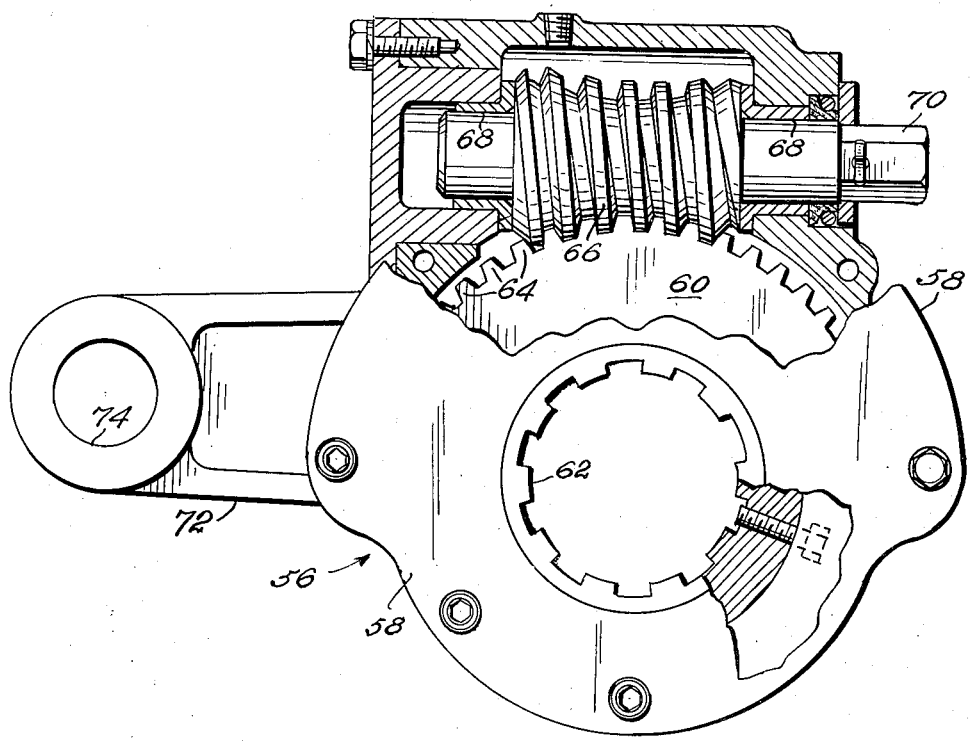
Fig. 4 is a semi-cross sectional view of the track adjusting assembly.

The track adjusting assembly 56 is best shown in Fig. 4 wherein the assembly comprises a housing 58 in which a segmental worm wheel 60 is rotatably mounted. Worm wheel 60 is internally splined as at 62 and is externally formed with worm teeth 64 through approximately one-third of the periphery. A worm 66 is journaled in housing 58 through bearings 68 and engages worm teeth 64, a hexagonal head 70 of the worm 66 permits a wrench to be applied for rotating the worm 66 and worm wheel 60, An extension 72 projects from housing 58 and is formed with a bore 74 for a purpose later described.

From Fig. 2 it will be apparent that the track adjusting assembly 56 is located on shaft 42, between the branches of arm 18, the spline of worm wheel 60 engaging the spline of shaft 42. The extension 72 connects to a link 76 through a pin 78 in bore 74 as shown in Fig. 5. The link 76 is attached to the frame of the vehicle by a pin 80 which is rigidly fixed to the frame by tightening nut 82. It will be observed that the pins 78 and 80 rotatably engage link 76 through spherical bearing means 84 insuring bind-free operation. Link 76 thereby serves to connect the track adjusting assembly 56 to a fixed point on the vehicle frame.

The operation of the invention is as follows: when the track is initially placed on the vehicle, the proper tension must be imposed on the track. This is accomplished by applying a wrench to head 70 and rotating worm 66 and worm wheen 60; as wheel 60 is keyed to shaft 42 the axle 16 will be rotated, orbital fashion about the axis of shaft 42, which increases or decreases the distance from axle 16 to spindle 20 thereby adjusting the track to the proper tension. The adjustment will be locked by the worm 66 as the power flow through worm 66 and worm wheel 60 is unidirectional.

During the motion of the vehicle, irregularities in the terrain will cause the road wheels and trailing idler wheel to move up and down and absorb the shock caused thereby. The resistance to the up and down movement of the track supporting wheels is provided by the torsion bars giving an efficient absorption of the irregularities encountered by the track.

If the trailing idler wheel was simply pivotally mounted, the oscillation of the supporting arm would cause the axle of the wheel to travel through an arc, for example, the axle would move in the path "A" of Fig. 6; this is objectionable as the arc through which the idler wheel will travel changes the total track length and therefore causes the tension in the track to change. Furthermore, the track tension has a component tending to depress the trailing idler wheel and cause a larger percentage of the weight to be supported by the idler wheel and subjecting the same to high stresses.

The invention eliminates the arcuate path of oscillation as the axle 16 of the idler wheel is not directly connected to arm 18, but instead is offset to shaft 42. As the arm 18 moves, the link 76 will also oscillate about the axis of pin 80 under the influence of the rise and fall of extension 72. This motion will in turn cause the extension 72 to be "rocked" thereby oscillating the track adjusting assembly 56 causing the shaft 42 to oscillate within the bearings 36 as axle 16 is carried by shaft 42 in offset relation thereto. This oscillation will rotate axle 16 about the axis of shaft 42 thereby changing the distance from the axes of spindle 20 and axle 16. The relationship between the lengths of arm 18, link 76, extension 72 and the distance between the axes of shaft 42 and axle 16 are such that the axle 16 and idler wheel 10 will travel in a substantially straight line B normal to the line C intersecting the track angle, see Fig. 6, as the idler wheel 10 moves up and down. It will be understood that the "track angle" is the included angle formed by the track as it approaches and leaves the idler wheel. The extension 40 will contact a buffer 86 to limit the upward movement under extreme "shock" conditions.

The linear path of the trailing idler wheel 10 will maintain a constant percentage of the vehicle weight carried by the idler wheel and not affect the original track tension appreciably, resulting in a trailing idler wheel which will require a minimum of maintenance and eliminates the primary causes for "throwing" tracks producing improved performance in track laying vehicles.

It will be understood that various forms of the invention other than that described herein may be apparent to those skilled in the art without departing from the spirit and scope of the invention and it is intended that the invention be limited only by the scope of the appended claims.

I claim:

1. In a trailing idler wheel assembly for vehicles comprising, an arm pivotally supported by the framework of said vehicle, an eccentric shaft journaled for rotation in said arm, an idler wheel carried by said shaft and means for automatically rotating said shaft in response to oscillations of said arm.

2. A trailing idler wheel assembly comprising, a pivotally supported arm, an eccentric shaft journaled in said arm, first means carried by said shaft for rotating said shaft, an idler wheel mounted on said shaft and second means for rotating said shaft connected to said first means whereby said eccentric shaft is automatically rotated in response to the oscillations of said arm.

3. A trailing idler wheel assembly for vehicles comprising, an arm pivotally supported by the frame of said vehicle, an eccentric shaft journaled in said arm, an idler wheel rotatably supported on said shaft, first means for initially rotating said shaft and second means connected to said shaft for automatically rotating said shaft in synchronization with oscillations of said arm.

4. A trailing idler wheel assembly for a vehicle comprising, an arm pivotally supported by the frame of said vehicle, an eccentric shaft journaled in said arm, manually operated means carried by said shaft operable to rotate said shaft and automatically actuated means for rotating said shaft in synchronization with oscillations of said arm whereby the relationship between the arm pivot support and idler wheel will vary in accordance with the position of said arm.

5. A trailing idler wheel assembly for vehicles comprising, an arm pivotally supported by the frame of said vehicle, an eccentric shaft journaled for rotation in said arm, an idler wheel rotatably mounted on said shaft, a housing supported by said shaft and rotatable therewith, manually adjusted means within said housing adapted to impart rotation to said shaft and means connecting said housing to the vehicle frame whereby oscillation of said arm will cause said housing and shaft to rotate in synchronization thereto.

6. A trailing idler wheel assembly as in claim 5 wherein said manually adjusted means comprises a worm mounted for rotation within said housing in engagement with a worm wheel keyed to said shaft.

7. A trailing idler assembly for vehicles comprising, an arm pivotally supported by the frame of said vehicle, an eccentric shaft journaled for rotation in said arm, an idler wheel rotatably carried by said shaft, a housing carried by said shaft for rotation therewith, manually adjustable means within said housing adapted to impart rotation to said shaft and means connecting said housing to the frame of the vehicle whereby oscillation of said arm will cause said housing and said shaft to rotate such that the combined oscillation and rotation will translate the idler wheel in a substantially linear path.

8. A trailing idler wheel assembly as in claim 7 wherein said manually adjustable means comprises a worm journaled in said housing and a worm wheel keyed to said shaft in engagement with said worm.

9. A trailing idler assembly as in claim 8 wherein said means connecting said housing to the vehicle frame comprises a link pivoted to the frame and an extension of said housing pivotally connected to said link.

References Cited in the file of this patent

UNITED STATES PATENTS

| | | |
|---|---|---|
| 1,981,867 | Knox et al. | Nov. 27, 1934 |
| 2,393,993 | Knox | Feb. 5, 1946 |
| 2,427,162 | Schilling et al. | Sept. 9, 1947 |
| 2,466,029 | Knox et al. | Apr. 15, 1949 |
| 2,728,611 | Brauss | Dec. 27, 1955 |